US010476204B2

(12) United States Patent
Finona et al.

(10) Patent No.: US 10,476,204 B2
(45) Date of Patent: Nov. 12, 2019

(54) LOW PROFILE SEALING INTERCONNECT WITH LATCHING INTERFACE

(71) Applicant: ITT Manufacturing Enterprises LLC, Wilmington, DE (US)

(72) Inventors: Michael Santos Finona, Fountain Valley, CA (US); Andrew Royce Ablott, Mission Viejo, CA (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 148 days.

(21) Appl. No.: 15/685,222

(22) Filed: Aug. 24, 2017

(65) Prior Publication Data

US 2018/0062311 A1 Mar. 1, 2018

Related U.S. Application Data

(60) Provisional application No. 62/379,645, filed on Aug. 25, 2016.

(51) Int. Cl.

| | |
|---|---|
| ***H01R 13/629*** | (2006.01) |
| ***G02B 6/38*** | (2006.01) |
| ***H01R 13/08*** | (2006.01) |
| ***H01R 13/52*** | (2006.01) |
| ***H01R 24/00*** | (2011.01) |
| ***H01R 24/20*** | (2011.01) |
| ***H01R 24/28*** | (2011.01) |
| ***H01R 13/627*** | (2006.01) |
| ***H01R 13/631*** | (2006.01) |
| *H01R 107/00* | (2006.01) |
| *H01R 13/24* | (2006.01) |

(52) U.S. Cl.

CPC ..... *H01R 13/62905* (2013.01); *G02B 6/3893* (2013.01); *H01R 13/08* (2013.01); *H01R 13/5219* (2013.01); *H01R 13/6275* (2013.01); *H01R 13/631* (2013.01); *H01R 24/005* (2013.01); *H01R 24/20* (2013.01); *H01R 24/28* (2013.01); *H01R 13/24* (2013.01); *H01R 2107/00* (2013.01)

(58) Field of Classification Search

CPC .............................................. H01R 13/62905

See application file for complete search history.

(56) References Cited

U.S. PATENT DOCUMENTS

| | | |
|---|---|---|
| 2,514,246 A | 7/1950 | Knox |
| 4,332,432 A | 6/1982 | Colleran |

(Continued)

OTHER PUBLICATIONS

Partial Search Report in European Patent Application No. 17187465.4, dated Jan. 24, 2018 in 14 pages.

(Continued)

*Primary Examiner* — James Harvey

(74) *Attorney, Agent, or Firm* — Knobbe Martens Olson & Bear LLP

(57) ABSTRACT

Various interconnect assemblies are disclosed. The interconnect assembly can include an insert having a hook protrusion that fits into a slot of a receiving region. The hook protrusion can have a curved surface that helps the hook protrusion slide into a slot as the insert is rocked toward the receiving region to seat the insert in the receiving region. The receiving region can have a latch that snaps over a key portion of the insert to keep the insert seated in the receiving region.

15 Claims, 12 Drawing Sheets

100 212 200 214 210 320 314 216 310 300 206 312 302 311 306 316

(56) References Cited

U.S. PATENT DOCUMENTS

| | | | |
|---|---|---|---|
| 4,431,244 A | 2/1984 | Anhalt et al. | |
| 4,448,467 A | 5/1984 | Weidler | |
| 4,449,767 A | 5/1984 | Weidler | |
| 4,973,268 A | 11/1990 | Smith et al. | |
| 4,984,998 A | 1/1991 | Duncan et al. | |
| 5,011,425 A | 4/1991 | Van Zanten et al. | |
| 5,030,127 A | 7/1991 | Blasko et al. | |
| 5,100,339 A | 3/1992 | Sato et al. | |
| 5,123,071 A | 6/1992 | Mulholland et al. | |
| 5,151,048 A | 9/1992 | Sato et al. | |
| 5,286,209 A * | 2/1994 | Nakagawa | H05K 7/1023 439/331 |
| 5,308,255 A | 5/1994 | Yamanashi | |
| 5,324,210 A | 6/1994 | Brickley | |
| 5,344,335 A | 9/1994 | Scholz et al. | |
| 5,382,177 A | 1/1995 | Hutchinson, Jr. et al. | |
| 5,389,014 A | 2/1995 | Kumpel et al. | |
| 5,399,045 A | 3/1995 | Yoneda et al. | |
| 5,416,922 A | 5/1995 | Horvat et al. | |
| 5,562,475 A | 10/1996 | Kern et al. | |
| 5,579,425 A | 11/1996 | Lampert et al. | |
| 5,591,042 A | 1/1997 | Takata et al. | |
| 5,593,320 A | 1/1997 | Konda et al. | |
| 5,651,689 A | 7/1997 | Plyler et al. | |
| 5,672,071 A | 9/1997 | Ceru | |
| 5,681,184 A | 10/1997 | Pamart et al. | |
| 5,685,731 A | 11/1997 | Lin | |
| 5,711,684 A | 1/1998 | Inoue et al. | |
| 5,803,651 A | 9/1998 | Saito | |
| 5,830,002 A | 11/1998 | Ito et al. | |
| 5,928,011 A | 7/1999 | Flask et al. | |
| 5,928,038 A | 7/1999 | Berg et al. | |
| 6,024,498 A | 2/2000 | Carlisle et al. | |
| 6,065,989 A | 5/2000 | Walkup et al. | |
| 6,257,917 B1 | 7/2001 | Hyzin | |
| 6,290,527 B1 | 9/2001 | Takaya et al. | |
| 6,319,043 B1 | 11/2001 | Takatsuki et al. | |
| 6,325,547 B1 | 12/2001 | Cammons et al. | |
| 6,338,657 B1 | 1/2002 | Harper | |
| 6,361,342 B1 | 3/2002 | Cox | |
| 6,364,685 B1 | 4/2002 | Manning | |
| 6,406,316 B1 | 6/2002 | Lemke et al. | |
| 6,435,895 B1 | 8/2002 | Fink et al. | |
| 6,435,896 B1 | 8/2002 | Takatsuki | |
| 6,506,070 B1 | 1/2003 | Huang | |
| 6,511,337 B1 | 1/2003 | Fandrey et al. | |
| 6,533,601 B2 | 3/2003 | Raudenbush et al. | |
| 6,595,790 B1 | 7/2003 | Bigotto | |
| 6,679,730 B2 | 1/2004 | Dye et al. | |
| 6,716,052 B2 | 4/2004 | Kane | |
| 6,780,045 B2 | 8/2004 | Shuey et al. | |
| 6,821,024 B2 | 11/2004 | Bates, III | |
| 6,908,233 B2 | 6/2005 | Nakajima et al. | |
| 6,916,196 B2 | 7/2005 | Long et al. | |
| 6,939,159 B1 | 9/2005 | Klein et al. | |
| 7,052,186 B1 | 5/2006 | Bates | |
| 7,108,540 B2 | 9/2006 | Annecke | |
| 7,261,580 B1 | 8/2007 | Secora | |
| 7,553,179 B2 | 6/2009 | Finona | |
| 2003/0091295 A1 | 5/2003 | Cheng | |
| 2011/0059642 A1 | 3/2011 | Slippy et al. | |
| 2018/0062311 A1 * | 3/2018 | Finona | G02B 6/3893 |

OTHER PUBLICATIONS

Extended European Search Reported in European Patent Application No. 17187465.4, dated May 16, 2018 in 13 pages.

"$43M to ITT for US Army Enhanced Night Vision Goggles", Defense Industry Daily Staff, Aug. 12, 2009 in 1 page. http://www.defenseindustrydaily.com/43M-to-ITT-for-US-Army-Enhanced-Niqht-Vision-Goggles-05698/.

* cited by examiner 304
302
202
204
201
200
100
300
301

LOW PROFILE SEALING INTERCONNECT WITH LATCHING INTERFACE

BACKGROUND

Field

The present disclosure relates to methods and devices related to an improved interconnect assembly.

Description of Certain Related Art

An interconnect is an electrical or optical connection that joins two or more electronic devices together. Interconnects can be used to allow the connected devices to transmit power and/or data to one another. Electrical interconnects can electrically and mechanically connect conductors of one device to conductors in another device.

SUMMARY

A need exists for interconnect assemblies that can be quickly and/or easily be installed. In some aspects, the interconnect assemblies of the present disclosure are adapted to be installed without the use of tools. In certain aspects, the interconnect assemblies can be installed with one hand. In some configurations, the interconnect assemblies can be installed blind, i.e., without requiring viewing of the components of the interconnect assembly.

BRIEF DESCRIPTION OF THE DRAWINGS

Various embodiments are depicted in the accompanying drawings for illustrative purposes, and should not be interpreted as limiting the scope of the embodiments. Furthermore, any features, structures, components, materials, and/or steps of different disclosed embodiments can be combined to form additional embodiments, which are part of this disclosure.

DETAILED DESCRIPTION

Figure 1:
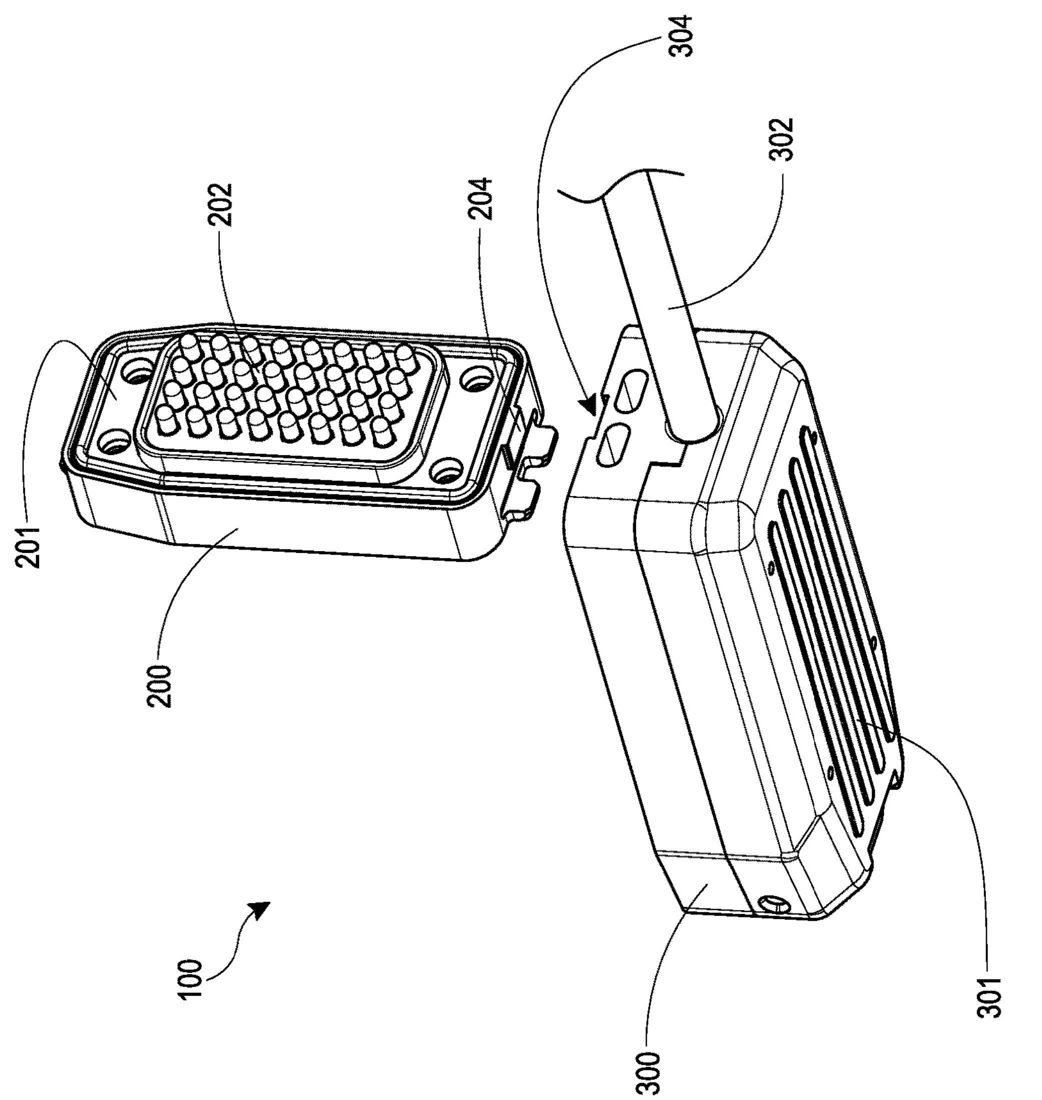
FIG. 1 is a perspective view of an insert and a receiving portion of a non-limiting example embodiment of an interconnect assembly.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. The aspects of the present disclosure, as generally described herein, and illustrated in the figures, may be arranged, substituted, combined, and designed in a wide variety of different configurations, all of which are explicitly contemplated and made a part of this disclosure.

Overview

FIG. 1 depicts an illustrative, non-limiting example of an interconnect assembly 100. The interconnect assembly 100 is described herein in the context of an electrical interconnect. However, in some configurations, the interconnect assembly 100 of the present disclosure can be an optical interconnect. The interconnect assembly 100 can include a first connector portion 200 and a second connector portion 300, which can be configured to engage together. For purposes of presentation, in this description, the first connector portion 200 is described as an insert and the second connector portion 300 is described as a receiving portion. For example, as illustrated, the insert 200 can be engaged with (e.g., sized to fit within) the receiving portion 300. However, various engagement configurations are contemplated, such as the first connector portion being the receiving portion and the second connector portion being the insert. In several embodiments, the insert 200 and/or the receiving portion 300 can have features that connect (e.g., electrically, optically, or otherwise) the interconnect assembly 100 with another device. For example, in the illustrated embodiment, the insert 200 has a pin interface 202 disposed on an opposed face 201 of the insert 200, and the receiving portion 300 has a cable 302. The cable 302 can be adapted to electrically connect the interconnect assembly 100 with another device. The pin interface 202 can be adapted to electrically connect the interconnect assembly 100 with another device. The opposed face 201 of the insert 200 can face away from the receiving portion 300 when the insert 200 is seated in the receiving portion 300. The receiving portion 300 can have an opposed face 301 that faces away from the insert 200 when the insert 200 is seated in the receiving portion 300.

As mentioned above, the insert 200 and the receiving portion 300 can be engaged together. This can be performed by at least one of the insert 200 and the receiving portion 300 being moved relative to the other. For example, the receiving portion 300 can be moved into mating engagement with the insert 200. In some embodiments, the insert 200 is held in a generally fixed position relative to a user, such as on a helmet or other article the user is wearing or carrying. The insert 200 and the receiving portion 300 can include alignment features that facilitate placement of the insert 200 within the receiving portion 300. In the illustrated embodiment, the insert 200 has a guide element (e.g., a guide protrusion 204) that extends from the periphery of the insert 200. The guide protrusion 204 can be sized to fit within a corresponding guide element (e.g., guide groove 304) disposed on the receiving portion 300. In some configurations, the arrangement of the alignment features could be reversed in that the receiving portion 300 can include a protrusion that fits within a groove disposed on the insert 200. As described below, the alignment features can be adapted to allow a user to align the insert 200 with the receiving portion 300 without requiring the user to view the insert 200 and/or the receiving portion 300. In other words, the alignment features can allow the insert 200 to be aligned with the receiving portion 300 by feel and/or with the sense of touch alone.

Figure 2:
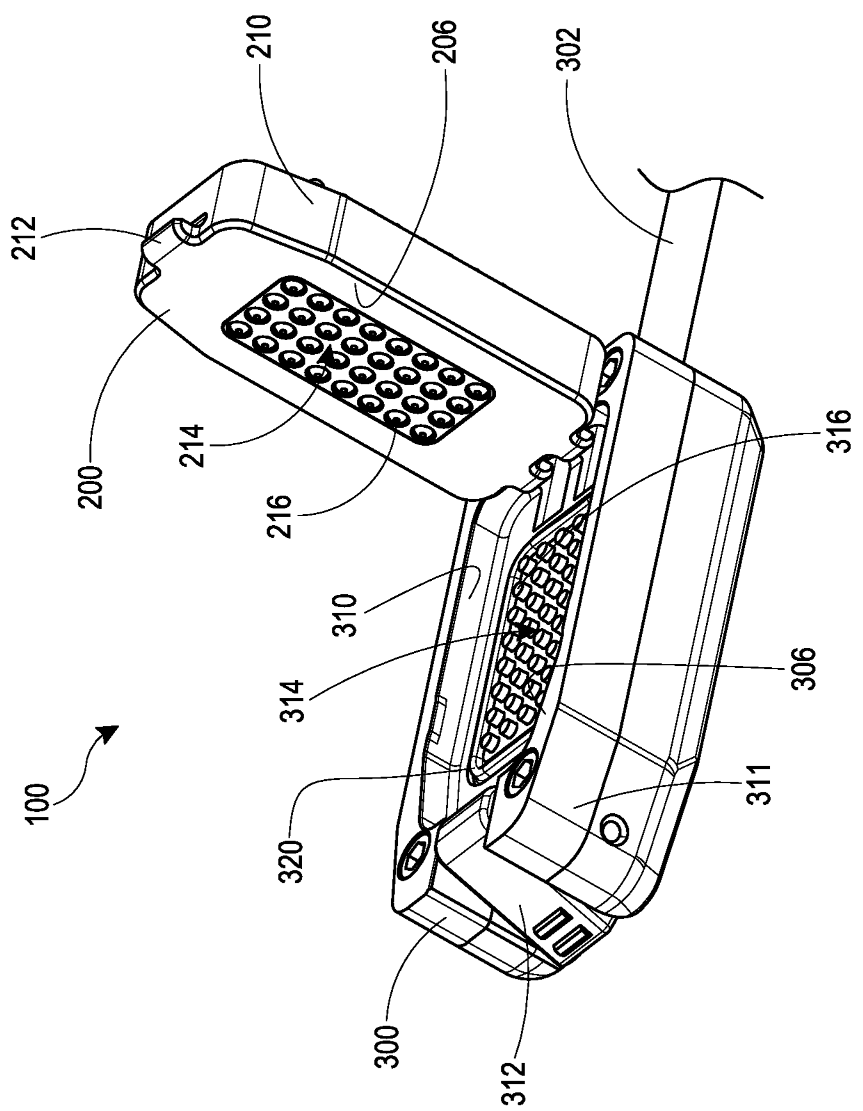
FIG. 2 is a perspective view of the embodiment of FIG. 1, with the insert in an initial engaged position relative to the receiving portion.

FIG. 2 shows the interconnect assembly 100 of FIG. 1 at an initial stage of coupling the insert 200 with the receiving portion 300. In the illustrated embodiment, the guide protrusion 204 (shown in FIG. 1) of the insert 200 is seated in the guide groove 304 (shown in FIG. 1) of the receiving portion 300. The receiving portion 300 can have an access face 306 that faces the insert 200 when the insert 200 is seated within the receiving portion 300. The insert 200 can have a docking face 206 that faces the access face 306 when the insert 200 is seated within the receiving portion 300.

The insert 200 can have a sidewall 210 that extends between the docking face 206 and the opposed face 201 (shown in FIG. 1) of the insert 200. The receiving portion 300 can have an outer sidewall 311 that extends between the access face 306 and the opposed face 301 (shown in FIG. 1). A central region of the access face 306 can be recessed relative to a peripheral portion of the access face 306 to form an inner sidewall 310, as shown in FIG. 2. In some configurations, the inner sidewall 310 of the receiving portion 300 can be contoured to match the sidewall 210 of the insert 200. In the illustrated embodiment, the inner sidewall 310 is substantially perpendicular to the access face 306. In some configurations, the inner sidewall 310 can be angled laterally outward in the direction away from the recessed portion of the access face 306. In the illustrated embodiment, the sidewall 210 of the insert 200 is substantially perpendicular to the docking face 206. In some configurations, the sidewall 210 of the insert 200 can be angled laterally outward in the direction from the docking face 206 to the opposed face 201.

In some configurations, the sidewalls 210, 310 can be sized so that the insert 200 can seat in the receiving portion 300 in only one orientation. For example, as shown in FIG. 2, the insert 200 can seat in the receiving portion 300 when oriented as depicted, but would not seat in the receiving portion 300 if the insert 200 were rotated 180° about an axis normal to the docking face 206.

With continued reference to FIG. 2, the receiving portion 300 can include a latch 312. The insert 200 can have a mating feature, such as a key 212. As described in more detail below, the latch 312 and the key 212 can be adapted so that the latch 312 retains the key 212 when the insert 200 is seated in the receiving portion 300.

The interconnect assembly 100 can include a docking array 214 that comprises a plurality of connectors (e.g., electrical connectors, optical connectors, and/or other types of connectors). The docking array 214 can be disposed on the docking face 206 of the insert 200. The receiving portion 300 can include an access array 314 of connectors (e.g., electrical connectors, optical connectors, and/or other types of connectors). The access array 314 can be disposed on the access face 306 of the receiving portion 300. The interconnect assembly 100 can be configured so that the docking array 214 comes into contact with the access array 314 when the insert 200 is seated in the receiving portion 300. The docking array 214 can include a plurality of docking contacts 216. The access array 314 can include a plurality of access contacts 316. The interconnect assembly 100 can be configured so that the docking contacts 216 are connected (e.g., electrically or optically) to the access contacts 316 when the insert 200 is seated in the receiving portion 300. In some configurations, the docking contacts 216 and access contacts 316 are arranged so that each docking contact 216 is coupled to only one access contact 316 when the insert 200 is seated in the receiving portion 300.

In the illustrated embodiment, the docking array 214 comprises a plurality of regularly spaced apart docking contacts 216 that are arranged in a 4-by-8 matrix. However, the docking contacts 216 can be arranged in other configurations. For example, the docking array 214 can include more than thirty-two docking contacts 216 or can include less than thirty-two docking contacts. The docking contacts 216 can be arranged in a configuration other than in rows. The docking contacts 216 need not be evenly spaced across the docking array 214. Likewise, the access contacts 316 can be arranged in configurations other than the depicted 4-by-8 matrix.

With continued reference to FIG. 2, the illustrated docking array 214 comprises docking contacts 216 that are flat and slightly recessed from the docking face 206 of the insert 200. The depicted access contacts 316 are pins that extend from the recessed portion of the access face 306. However, the configuration of the contacts 216, 316 can be reversed such that the docking contacts 216 are pins that extend from the docking face 206 and the access contacts 316 are flat surfaces. In some embodiments, the contacts 216, 316 are spring-loaded connectors (e.g., pogo pin connectors). In some configurations, the interconnect assembly 100 includes one or more spring-loaded connectors that is at least partially compressed when the insert 200 is seated in the receiving portion 300.

As shown in FIG. 2, the interconnect assembly 100 can include a seal 320. The seal 320 can be adapted to block contaminants (e.g., dirt, water, gases) from reaching the arrays 214, 314. In the illustrated embodiment, the seal 320 is a gasket that surrounds a periphery of the access array 314. The seal 320 can be configured to seal with the docking face 206 when the insert 200 is seated in the receiving portion 300. In some implementations, the arrangement of the seal 320 is reversed in that the seal 320 can be disposed on the docking face 206 of the insert 200 and seal with the access face 306 of the receiving portion 300. In some configurations, the seal 320 is disposed between the sidewall 210 of the insert and the inner sidewall 310 of the receiving portion 300. In some embodiments, the interconnect assembly 100 comprises multiple seals 320. For example, the interconnect assembly 100 can include two concentric seals 320 that surround the access array 314, or the interconnect assembly 100 can include a seal 320 disposed on the access face 306 and a seal 320 disposed on the inner sidewall 310. In some embodiments, the interconnect assembly 100 comprises a seal 320 disposed on the sidewall 210 of the insert 200.

Figure 3:
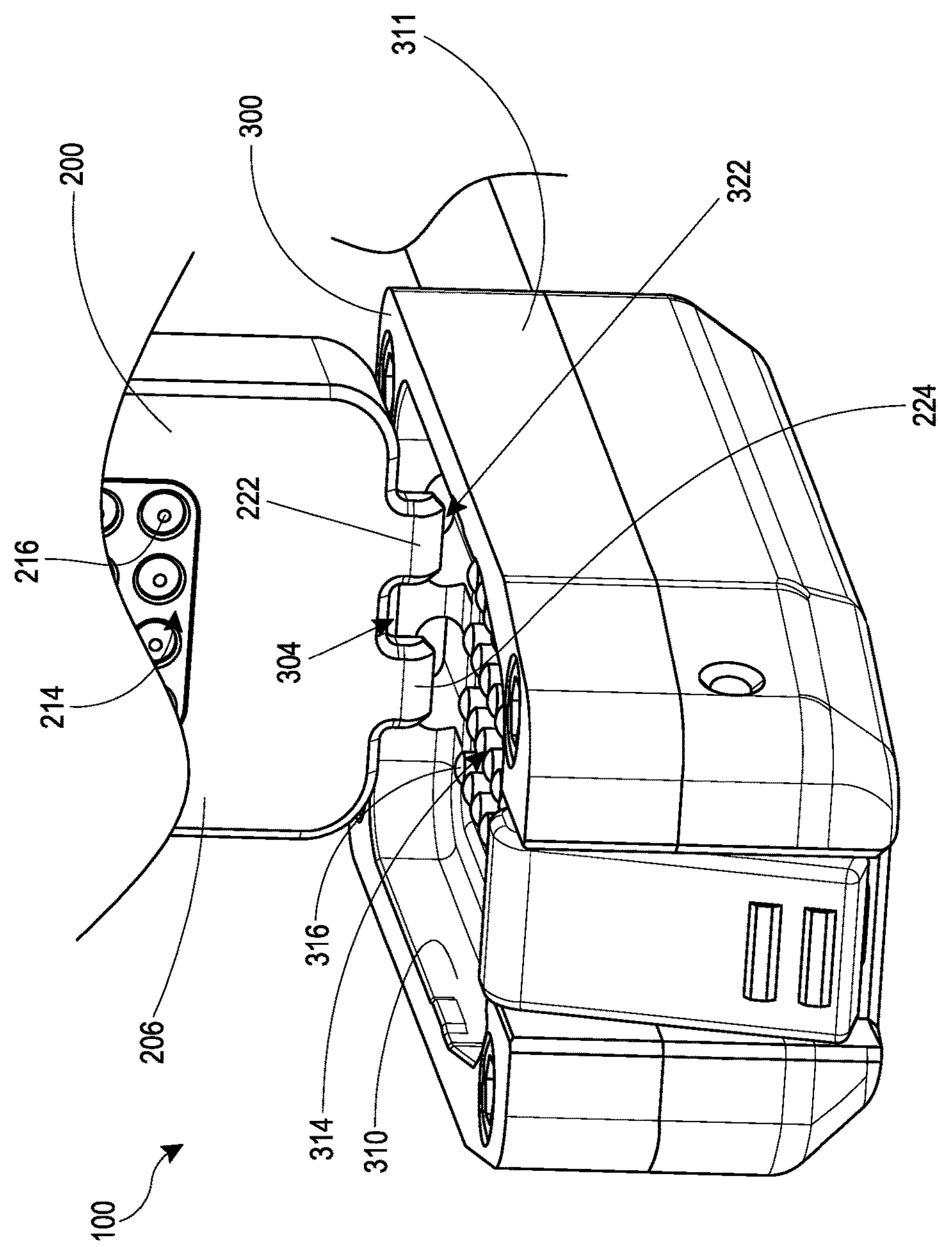
FIG. 3 is a close-up view of the embodiment of FIG. 2.

FIG. 3 shows a close up view of the interconnect assembly 100 in the vicinity of the guide groove 304. The insert 200 can include a first engagement feature, such as a hook protrusion 222. The receiving portion 300 can include a second engagement feature, such as a slot 322 that opens to the inner sidewall 310 of the receiving portion 300. As shown in FIG. 3, the interconnect assembly 100 can be adapted so that the hook protrusion 222 aligns with the slot 322 when the guide protrusion 204 (shown in FIG. 1) is seated into the guide groove 304. In the illustrated embodiment, the interconnect assembly 100 has a plurality (e.g., two) of spaced-apart hook protrusions 222 that align with a corresponding plurality (e.g., two) of spaced-apart slots 322. In some configurations, the interconnect assembly 100 has only one hook protrusion 222 and one slot 322. In some embodiments, the interconnect assembly 100 has more than two hook protrusions 222 and more than two slots 322. In the illustrated embodiment, the slot 322 is a through hole. In some embodiments, the slot 322 is a blind hole and/or dead end cavity that does not pass open to the outer sidewall 311 of the receiving portion 300.

With continued reference to FIG. 3, the hook protrusion 222 can have a curved base surface 224. The base surface 224 can be adapted to facilitate a smooth rolling motion between the insert 200 and the receiving portion 300 as the docking array 214 of the insert 200 is rotated toward the access array 314 of the receiving portion 300. As discussed later, the interconnect assembly 100 can be adapted so that the hook protrusion 222 advances into the slot 322 as the docking array 214 of the insert 200 is rotated toward the access array 314 of the receiving portion 300.

Figure 4:
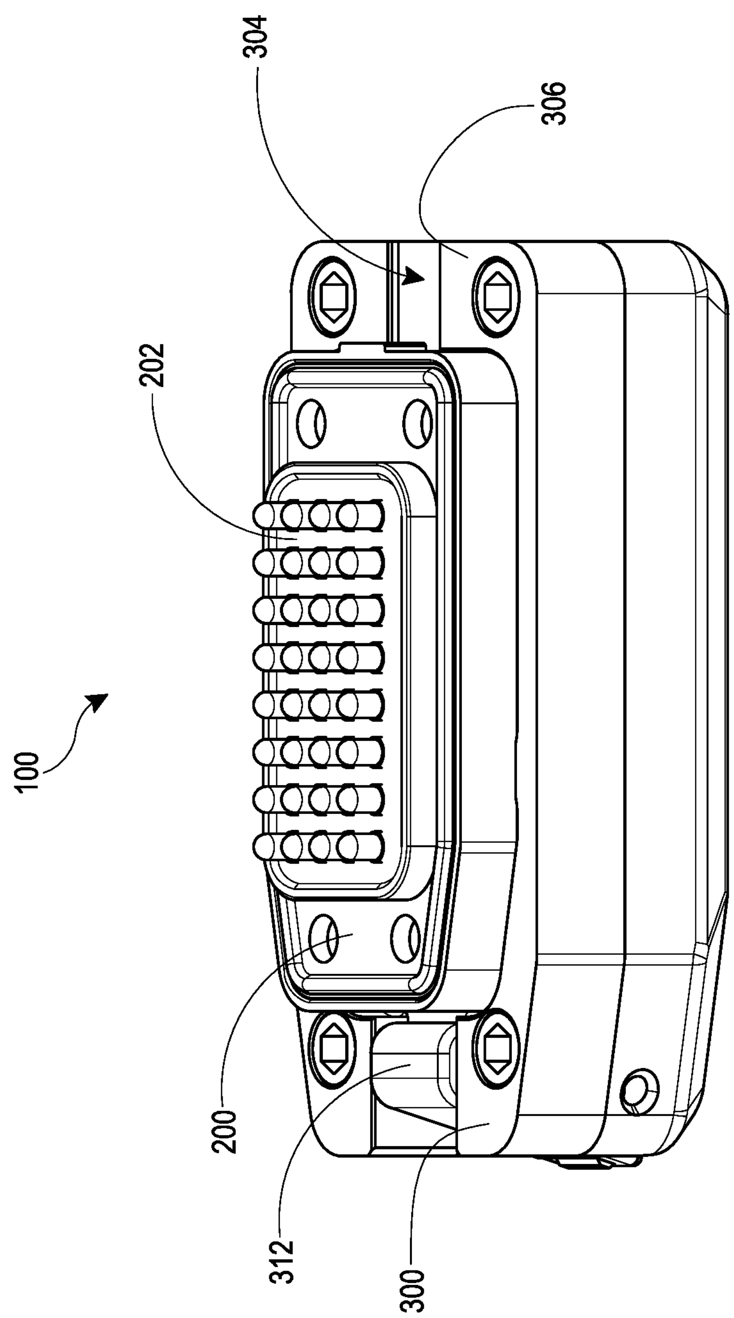
FIG. 4 is a perspective view of one embodiment of an interconnect assembly.

FIG. 4 depicts an embodiment of the interconnect assembly 100 with the insert 200 seated in the receiving portion 300. In the illustrated embodiment, the latch 312 is biased to engage (e.g., cover) the key 212 (shown in FIG. 2) of the insert 200. The hook protrusions 222 (shown in FIG. 3) cannot be seen in FIG. 4 because they extend into slots 322 that are hidden by the access face 306 of the receiving portion 300. The insert 200 is secured in the receiving portion 300 by the latch 312, which retains the key 212, and by the slots 322, which retain the hook protrusions 222. As discussed below, the latch 312 can be moved so that the latch 312 disengages (e.g., uncovers) the key 212, allowing the insert 200 to be separated from the receiving portion 300.

Figure 5:
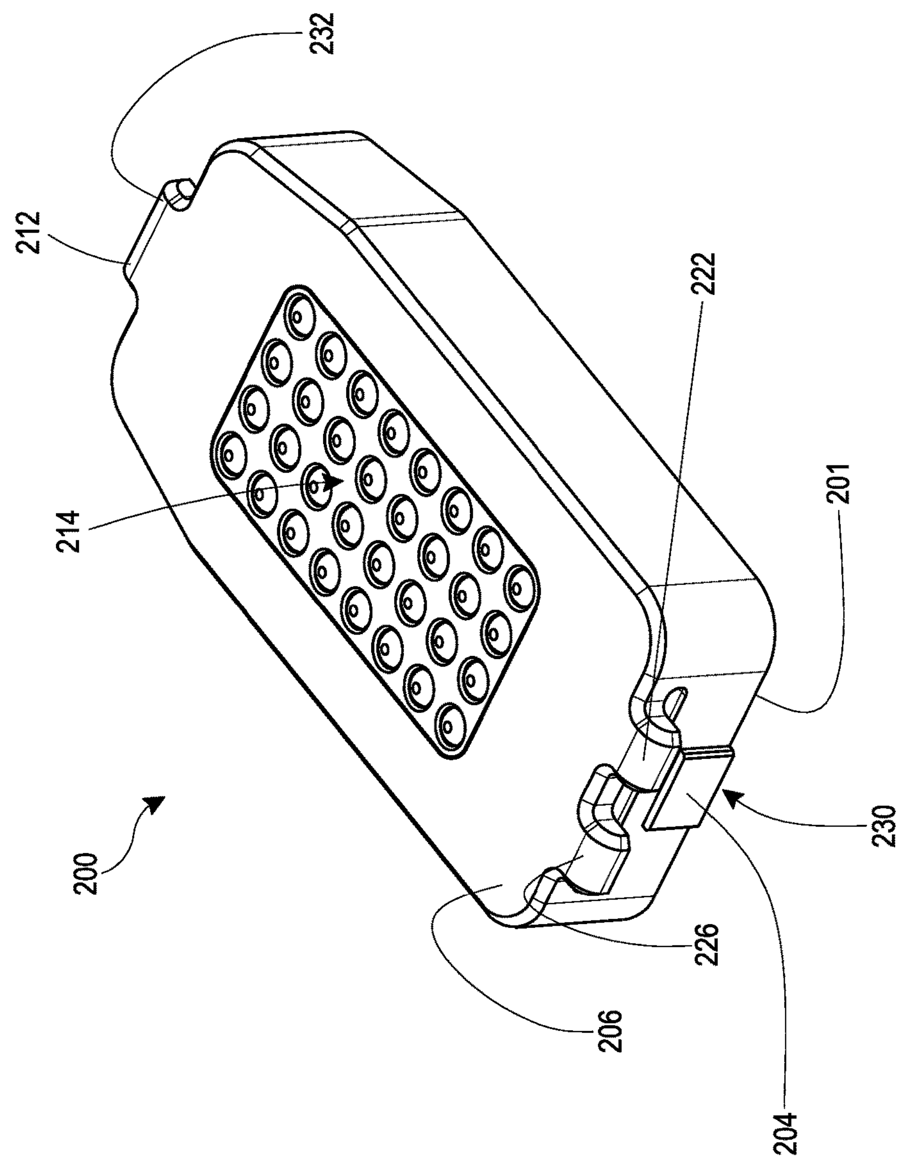
FIG. 5 is a perspective view of the insert of the embodiment of FIG. 1.

FIG. 5 shows an embodiment of the insert 200. In the illustrated embodiment, the hook protrusion 222 has an array-facing surface 226 that is generally co-planar with the docking face 206 of the insert 200. In some configurations, the array-facing surface 226 of the hook protrusion 222 can be recessed in, or can be proud of, relative to the docking face 206. In the illustrated embodiment, the guide protrusion 204 has a far edge 230 that can be substantially flush with the opposed face 201 of the insert 200. In some configurations, the far edge 230 of the guide protrusion 204 can be recessed or can be proud relative to the opposed face 201 of the insert 200. In the illustrated embodiment, the key 212 has an array-facing surface 232 that is generally co-planar with the docking face 206 of the insert 200. In some configurations, the array-facing surface 232 of the key 212 can be recessed or can be proud relative to the docking face 206.

Figure 6:
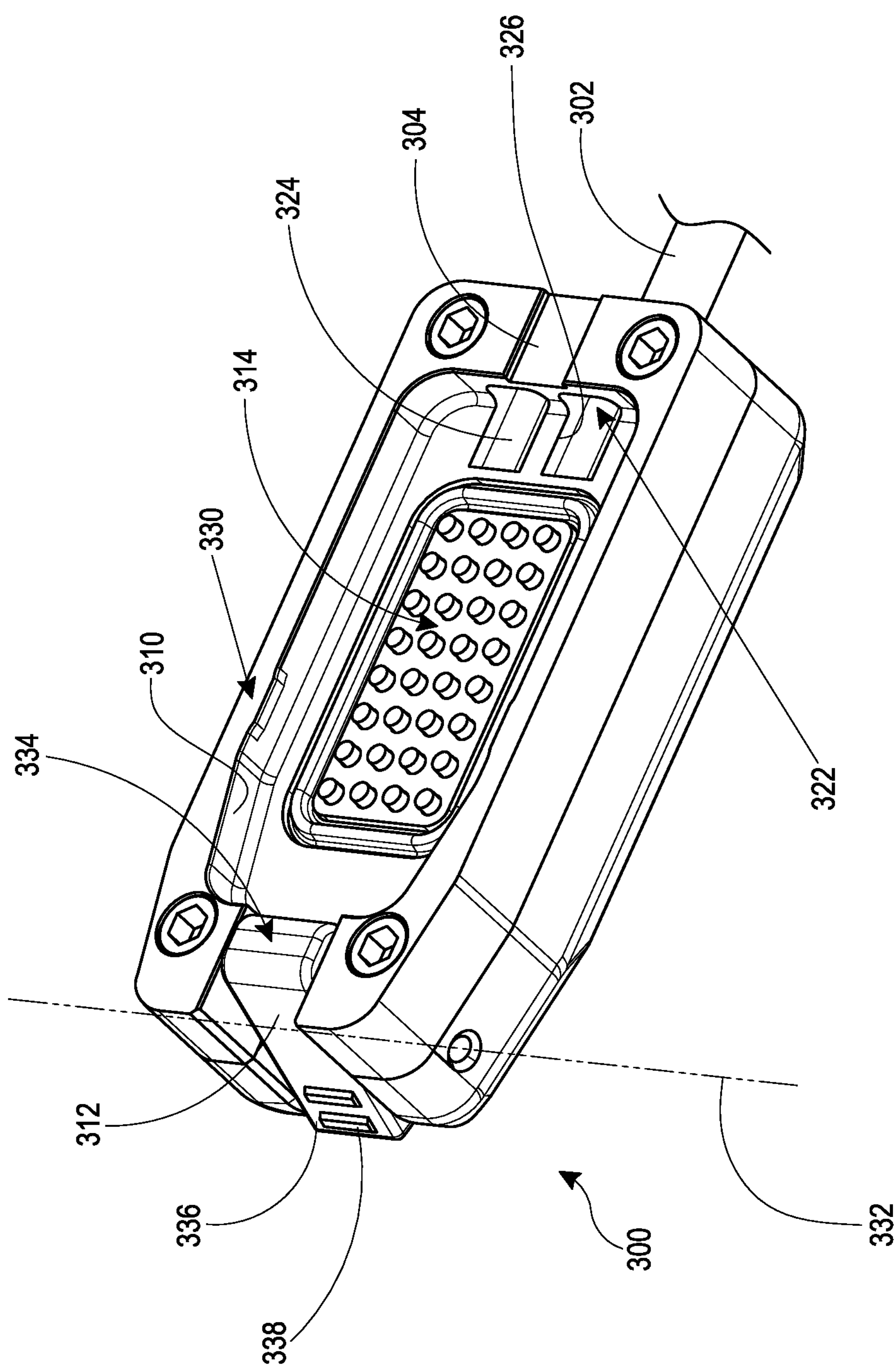
FIG. 6 is a perspective view of the receiving portion of the embodiment of FIG. 1.

FIG. 6 shows an embodiment of the receiving portion 300. The receiving portion 300 can include an ingress channel 324 adapted to help guide the hook protrusion 222 of the insert 200 into the slot 322 of the receiving portion 300. In the illustrated embodiment, the receiving portion 300 has two ingress channels 324, with each of the ingress channels 324 being aligned with one of the two slots 322. As shown in FIG. 6, the ingress channel 324 can be a further recess within the recessed portion of the access face 306 on which the access array 314 is disposed. As shown, the ingress channel 324 can be bounded by a rail 326 or lip on the edge of the ingress channel 324. The rail 326 can serve as a guide that aids in maintaining the hook protrusion 222 in the ingress channel 324 as the hook protrusion 222 advances toward the slot 322. In some configurations, the ingress channel 324 can be generally co-planar with the surface on which the access array 314 is disposed, with the ingress channel 324 being proud relative to this surface. In some embodiments, the ingress channel 324 is recessed relative to the surface on which the access array 314 is disposed and/or includes one or more rails 326 that are proud relative to this surface.

With continued reference to FIG. 6, the receiving portion 300 can include one or more fine alignment features 330. The fine alignment feature 330 can facilitate proper alignment of the contacts 216 of the docking array 214 with the contacts 316 of the access array 314. In some embodiments, the fine alignment features 330 aid in laterally positioning the insert 200 in the receiving portion 300. In the illustrated embodiment, the fine alignment feature 330 is a small protrusion that extends from the inner side wall 310 toward the access array 314. The fine alignment feature 330 of the illustrated embodiment is a pair of these small protrusions that face one another across the access array 314. As shown, the access array 314 can be located between the fine alignment features 330 which is disposed between the pair of small protrusions.

As mentioned above, the receiving portion 300 can include a latch 312. The latch 312 can be configured to help keep the insert 200 seated in the receiving portion 300, such as after the insert 200 and the receiving portion 300 have been joined together. As shown in FIG. 6, the latch 312 can be a rocking latch that pivots about a latch axis 332. The latch 312 can be configured so that a tip 334 of the latch 312 rotates away from the access array 314 when pressure is applied to a base 336 of the latch 312, as discussed below.

The latch 312 can include one or more tactile features 338. The tactile features 338 can aid a user in finding the base 336 by touch and/or without requiring the user to view the receiving portion 300 or other components of the interconnect assembly 100. As shown in FIG. 6, the tactile features 338 can be a raised rib on the surface of the latch 312. In the illustrated embodiment, the tactile features 338 comprises a pair of linear, generally parallel ribs. However, the tactile features 338 can have other configurations, such as a raised dot, a depressed dot, a wavy protrusion, or other configurations.

Figure 7:
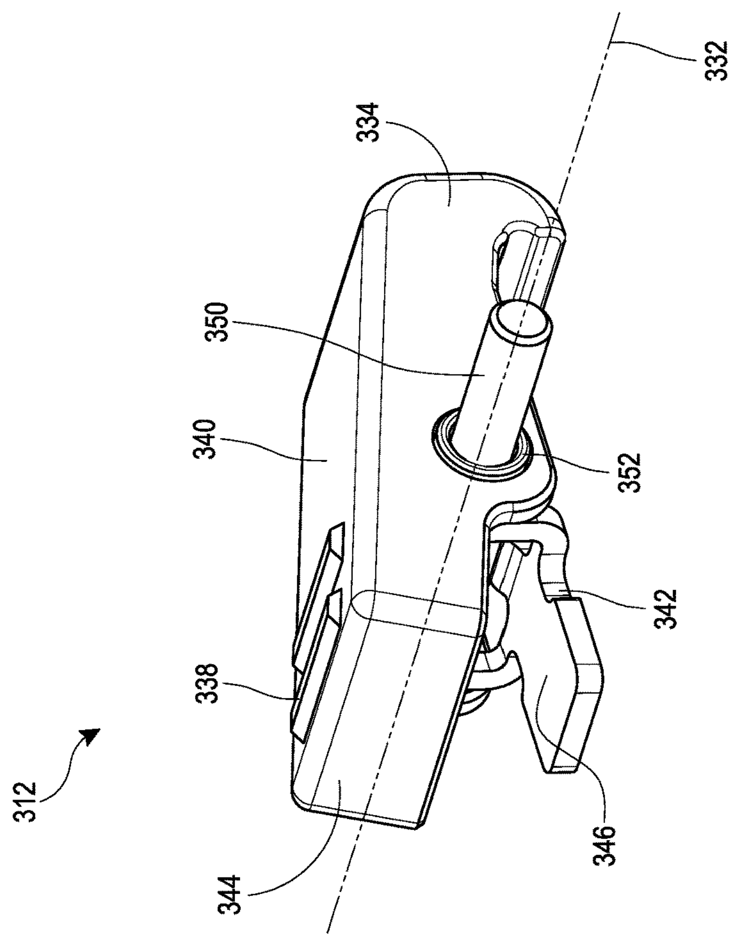
FIG. 7 is a perspective view of a latch of the embodiment of FIG. 1.

FIG. 7 shows an embodiment of the latch 312 of the interconnect assembly 100. The latch 312 can include a cover 340 and a resilient member 342. The resilient member 342 can be adapted to bias the cover 340 toward an at-rest position. For example, in the illustrated embodiment, the resilient member 342 can be adapted to bias the base 344 of the cover 340 away from the base 346 of the resilient member 342.

The latch 312 can be configured so that the base 344 of the cover 340 can be compressed toward the base 346 of the resilient member 342 by applying a pressure in the vicinity of the tactile features 338. As the base 344 of the cover 340 moves toward the base 346 of the resilient member 342, the tip 334 of the cover 340 moves to a latch-release position, as described below. When pressure is not applied to the base 344 of the cover 340, the resilient member 342 restores the base 344 of the cover 340 away from the base 346 of the resilient member 342, moving the tip 334 of the cover 340 to a latch-closed position. As shown in FIG. 7, the latch 312 can include a dowel 350 that couples the cover 340 to the resilient member 342. The dowel 350 can serve as a pivot for the cover 340 to rotate relative to the resilient member 342. The latch 312 can include a bushing 352 that secures the cover 340 to the dowel 350. As described below, the bushing 352 can help maintain proper alignment between the dowel 350, the cover 340, and the resilient member 342.

Figure 8:
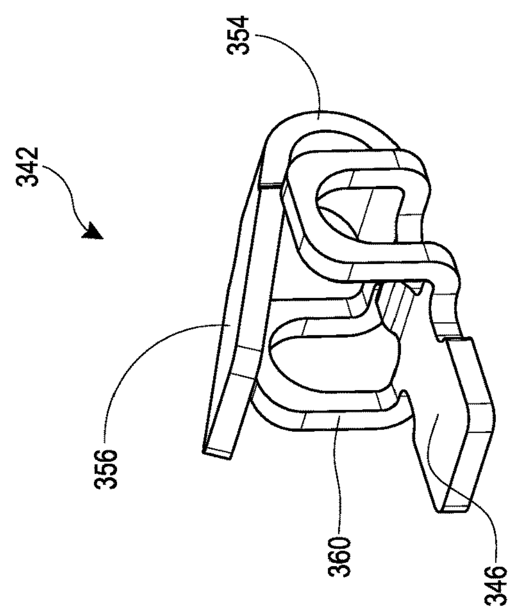
FIG. 8 is a perspective view of a resilient member of the latch of FIG. 7.

FIG. 8 shows an embodiment of the resilient member 342. In the illustrated embodiment, the resilient member 342 comprises a bridge 354 that joins an arm 356 of the resilient member 342 to the base 346 of the resilient member 342. The bridge 354 can comprise an elastically deformable member (e.g., polymer, metal, etc.). The arm 356 can move toward the base 346 when the latch 312 is moved to the latch-release position. The bridge 354 can deform elastically to allow the arm 356 to move toward the base 346. As described below, the interconnect assembly 100 can be configured to limit the amount the bridge 354 deflects when the latch 312 is moved to the latch-release position. Limiting the deflection of the bridge 354 can inhibit or prevent violating the yield limit of the bridge 354. The resilient member 342 can have other configurations. For example, the resilient member 342 can have a compression spring (not shown) disposed between the arm 356 and the base 346 of the resilient member 342.

With continued reference to FIG. 8, the resilient member 342 can include a frame 360. In some configurations, the frame 360 can help maintain proper alignment between the resilient member 342 and other components of the latch assembly 100 (e.g., the cover 340, the receiving portion 300, or other components). In the illustrated embodiment, the frame 360 includes a pair of wings disposed on either side of the base 346. As shown, the wings can be generally U-shaped. As described below, the wings of the frame 360 can form a bracket the helps to maintain proper alignment between the dowel 350, the cover 340, and the resilient member 342.

Figure 9B:
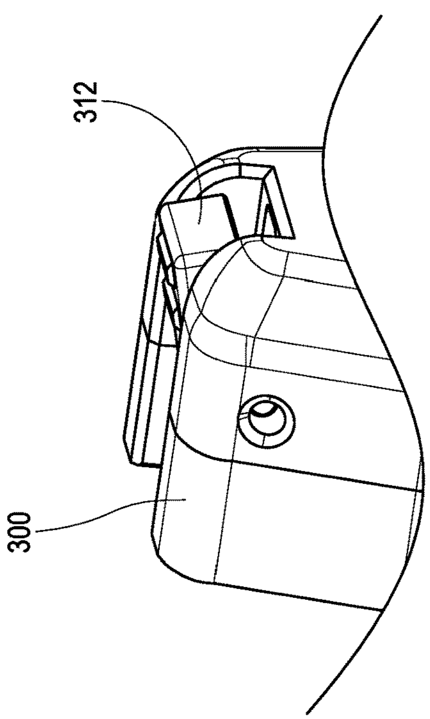
FIG. 9B is a partial side perspective view of the latch and the receiving portion of FIG. 9A.
Figure 9A:
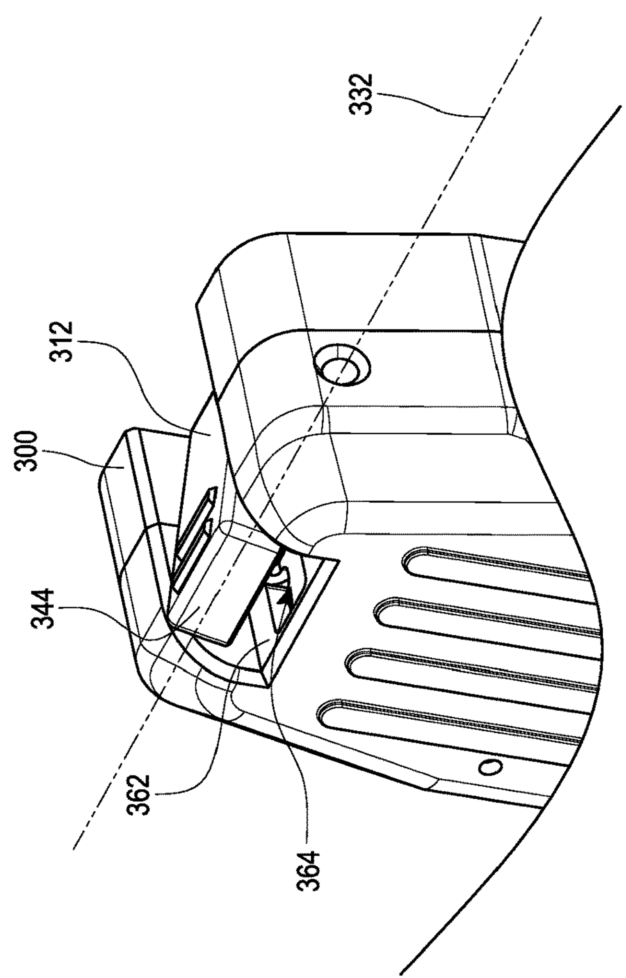
FIG. 9A is a partial rear perspective view of the latch and receiving portion of the embodiment of FIG. 1.

FIG. 9A shows an embodiment of the latch 312 and the receiving portion 300 of the interconnect assembly 100. In the illustrated embodiment, the receiving portion 300 includes a ledge 362 that is configured to contact the base 344 of the latch 312 and limit the extent to which the latch 312 can rotate about the latch axis 332. As shown in FIG. 9, the ledge 362 can surround a pocket 364 that is recessed relative to the ledge 362. The base 346 of resilient member 342 can sit in the pocket 364. In various embodiments, the movement of the latch 312 can be restricted so that the yield strength of the resilient member 342 is not violated when the base 344 of the latch 312 is compressed to move the latch 312 to the latch-release position. For example, the base 344 of the cover can abut against the ledge 362, thereby inhibiting further movement of the cover 340 and/or deflection of the resilient member 342.

As shown in FIG. 9B, the receiving portion 300 and/or the latch 312 can have a contoured profile. This can reduce the chance of the receiving portion 300 and/or latch 312 from becoming snagged on to other items. In some configurations, the latch 312 profile is configured to reduce the amount the latch 312 extends beyond the receiving portion 300. Reducing the amount the latch 312 extends beyond the receiving portion 300 can help avoid the latch 312 being unintentionally moved to the latch-release position, which may occur if, for example, the interconnect assembly 100 is bumped by an external element (e.g., a wall). In some embodiments, as shown, the amount that the latch 312 protrudes out of the receiving portion 300 is less than or equal to the distance the latch 312 travels between compressed and uncompressed positions and/or less than or equal to the diameter of the dowel 350 and/or less than or equal to about half of the lateral width of the cover 340.

Figure 10:
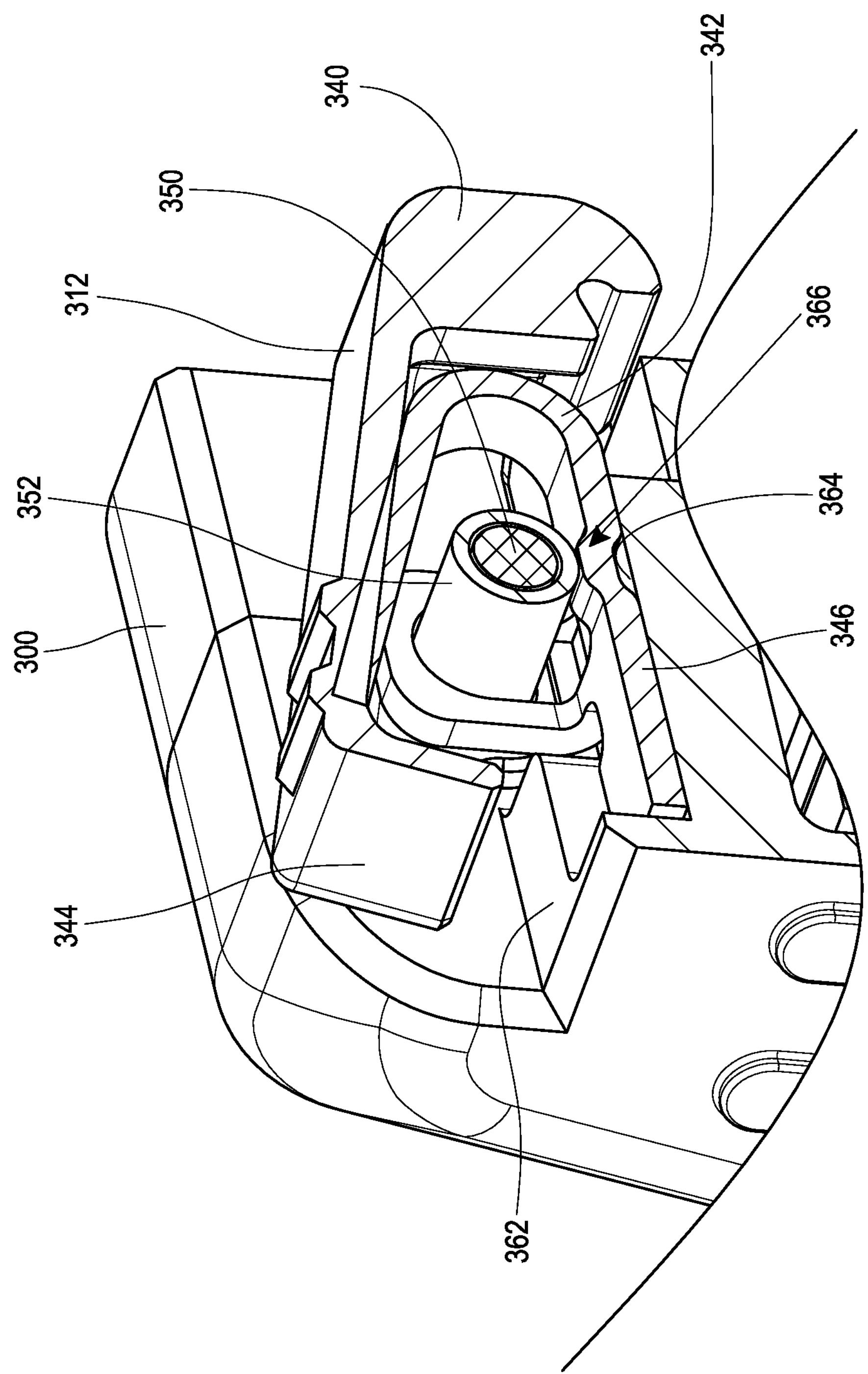
FIG. 10 is a partial perspective cross-sectional view of the latch and the receiving portion of FIG. 9A.

FIG. 10 shows a cross-sectional view of an embodiment of the latch 312 in an assembled state. As mentioned, the base 346 of the resilient member 342 can sit in a pocket 364 that is recessed from a surrounding ledge 362. The resilient member 342 can include an alignment feature 366 that helps maintain proper alignment between the latch 312 and the receiving portion 300. In the illustrated embodiment, the alignment feature 366 is a raised portion of the resilient member 342 that restricts movement of the bushing 352 toward the pocket 364 (e.g., downward in FIG. 10). As mentioned above, the frame 360 can restrict movement of the bushing 352 (e.g., upward and/or laterally in FIG. 10). For example, the U-shaped portions of the frame 360 can restrict the bushing 352 from moving away from the pocket 364. In this way, the frame 360 and the alignment feature 366 can restrict vertical movement of the bushing 352 relative to the pocket 364. In some configurations, the bushing 352 can include one or more flanges (not shown) that inhibit or prevent the bushing 352 from moving past the frame 360 along the axis of the dowel 350. In various embodiments, the resilient member 342 is slightly compressed in the assembled state shown in FIG. 10 compared to the free state shown in FIG. 8. This can provide a preload on the latch 312. In some embodiments, the preload and/or the restrictions on the dowel 350 provided by the alignment feature 366 and frame 360 can help to maintain the latch 312 in the assembled state. In certain implementations, the latch 312 is maintained in the assembled state without bonding, welding, and/or swaging of the components (e.g., the resilient member 342, dowel 350, frame 360, and/or alignment feature 366). This can ease manufacturing, such as by reducing the number of manufacturing steps, reducing cost, and/or increasing efficiency.

Figure 11:
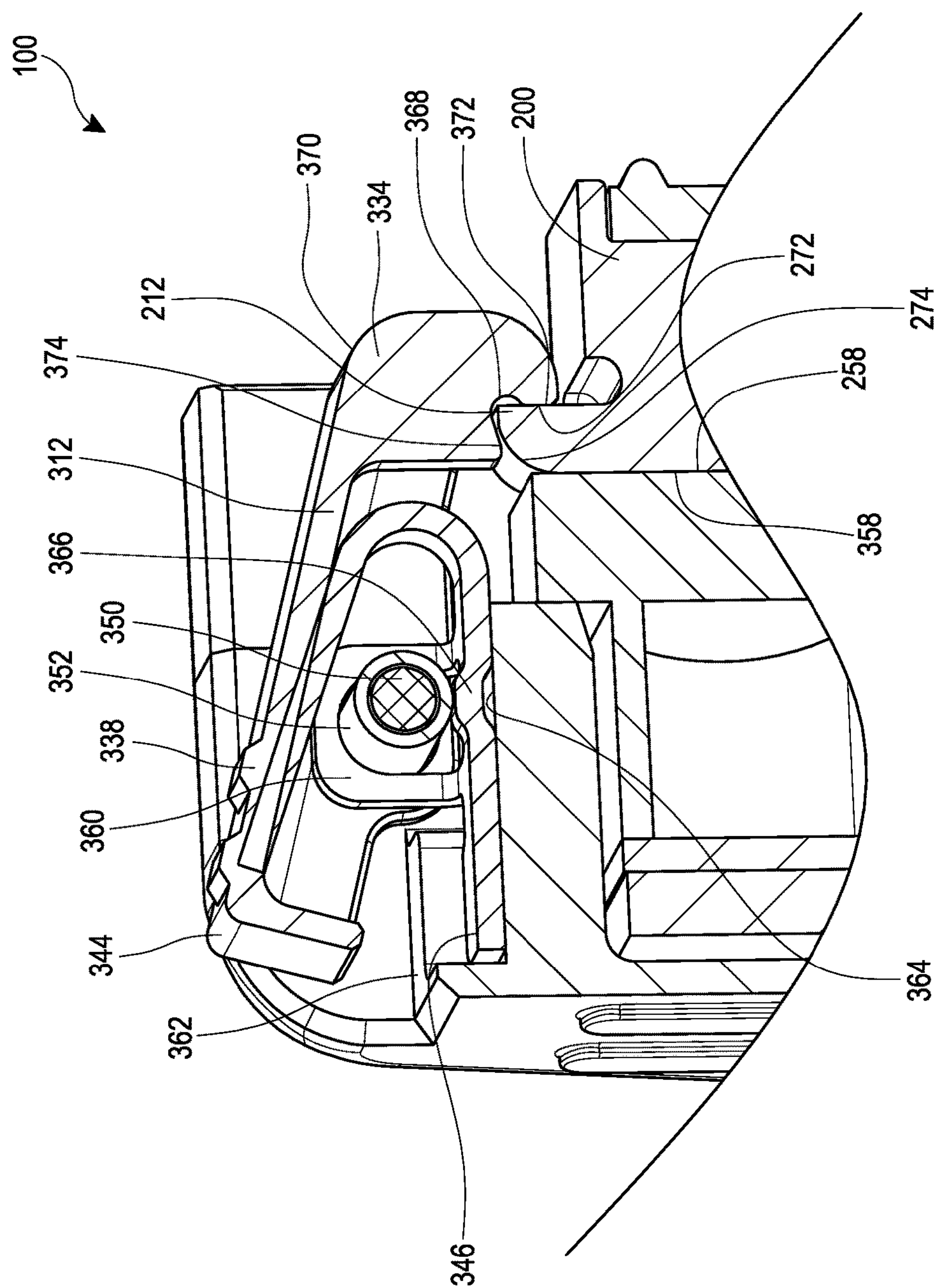
FIG. 11 is another partial perspective side cross-sectional view of the latch and the receiving portion of FIG. 9A.

FIG. 11 shows a cross-sectional view of an embodiment of the interconnect assembly 100 with the latch 312 engaged with (e.g., secured over) the key 212 of the insert 200. In the illustrated embodiment, the key 212 has a groove that receives a portion of the tip 334 of the latch 312, as shown by a portion of the key 212 extending vertically past the tip 334 of the latch 312. In some configurations, the key 212 is flat and does not extend vertically past the tip 334 of the latch 312. In some configurations, the outer surface 370 of the tip 334 of the latch 312 can be contoured to provide a cam surface. In some embodiments, the key 212 of the insert 200 can be pressed against the cam surface, which forces the latch 312 out of the latch-closed position. This can allow the key 212 to slide past the latch 312 as the insert 200 is snapped into place in the receiving portion 300. In some embodiments, the insert 200 can be secured into the receiving portion 300 without a user needing to activate (e.g., touch) the latch 312.

As further shown in FIG. 11, the insert 200 and/or the receiving portion 300 can include features to aid in engagement and/or manufacturability. For example, as illustrated, the insert 200 and the receiving portion 300 can include generally flat mating surfaces 258, 358, which can facilitate a secure connection between the insert 200 and the receiving portion 300. In some embodiments, as shown, the tip 334 of the latch 312 can include a recess 368, such as an undercut. The recess 368 can aid in engaging the latch 312 with the insert 200, manufacturing the latch 312, reducing stress concentrations, and/or otherwise. As illustrated, in the assembled interconnect assembly 100, the recess 368 can be near or adjacent a corner of the key 212. In some variants, the recess 368 receives a portion of the key 212. In certain implementations, the tip 334 of the latch 312 has a tip first engagement surface 372 that is configured to mate with (e.g., abut against) a corresponding key first engagement surface 272 of the key 212. As shown, the first engagement surfaces 272, 372 can be generally flat. In some embodiments, the tip 334 has a tip second engagement surface 374 that is configured to mate with a corresponding key second engagement surface 274. As illustrated, in some embodiments, the key second engagement surface 274 is rounded. The tip second engagement surface 374 can be angled relative to the key second engagement surface 274, such as being tangential to the key second engagement surface 274, as shown. As illustrated, in the assembled interconnect assembly 100, the tip second engagement surface 374 can provide a physical interference that inhibits or prevents removal of the insert 200 from the receiving portion 300.

Figure 12:
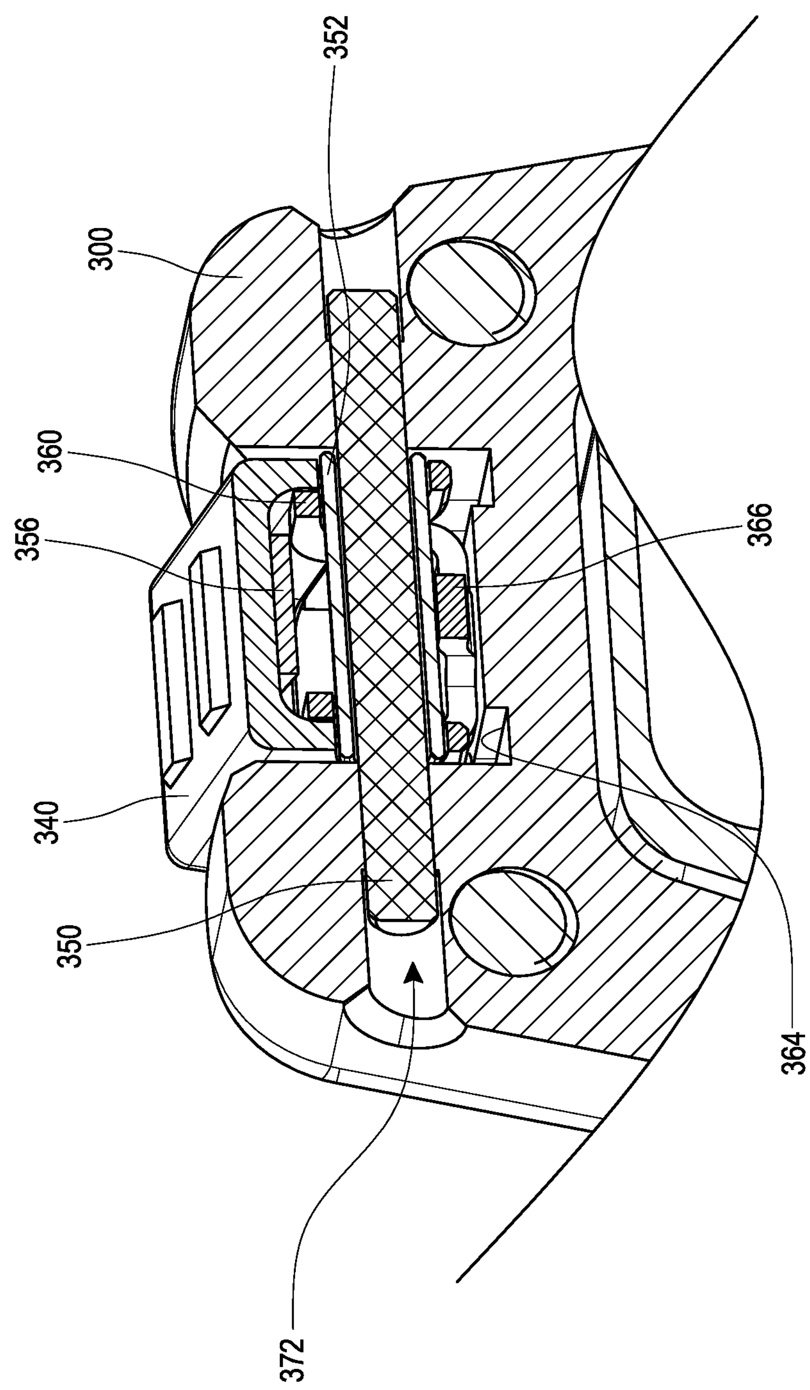
FIG. 12 is a partial bottom cross-sectional view of the latch and the receiving portion of FIG. 9A.

FIG. 12 shows a bottom cross-sectional view of the latch 312. In the illustrated embodiment, the dowel 350 sits inside a channel 372 of the receiving portion 300. The dowel 350 passes through the bushing 352. As shown in FIG. 12, the bushing 352 can have a larger diameter of the channel 372 and can restrict movement of the dowel 350 along the axis of the channel 372. Movement of the bushing 352 relative to the resilient member 342 is restricted by the alignment feature 366 and the frame 360, as described above. Accordingly, the dowel 350, the bushing 352, the channel 372, and the resilient member 342 can be configured to maintain proper alignment of the latch 312 with the receiving portion 300.

Figure 13B:
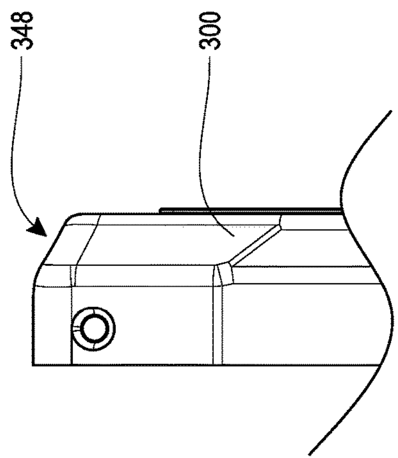
FIGS. 13A-13C illustrate another embodiment of an interconnect assembly, having an identification facilitating feature.
Figure 13C:
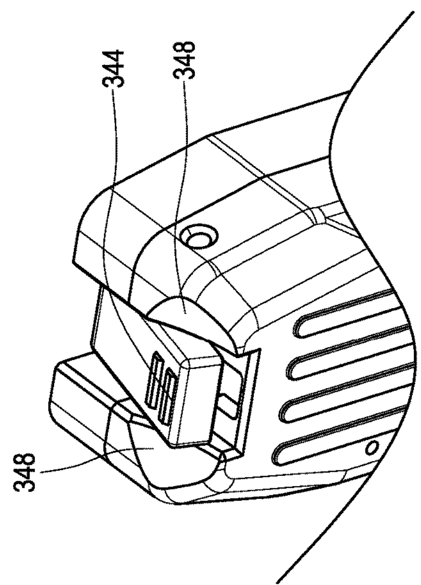
Figure 13A:
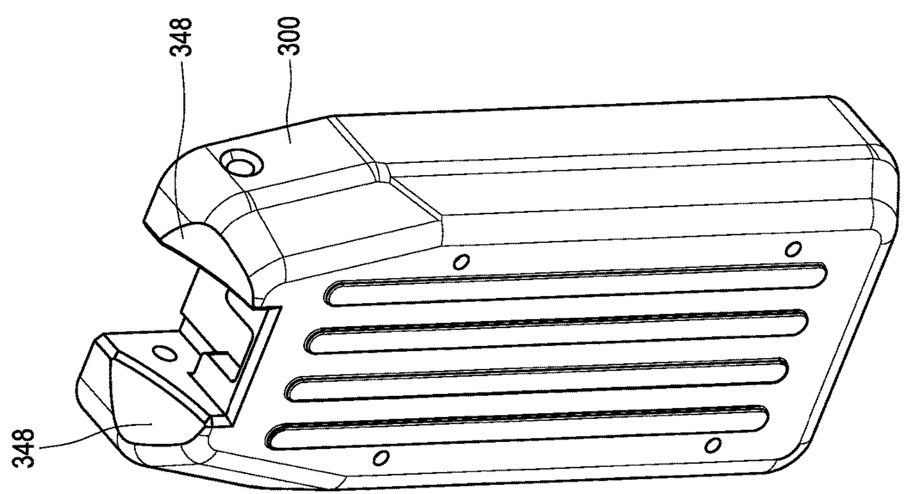

FIGS. 13A-13C illustrate another example of the interconnect assembly 100. As shown, the receiving portion 300 can include an indicator 348, such as a recess. The indicator 348 can aid in a user locating and/or actuating the latch 312. For example, the indicator 348 can serve as a tactile guide or marker to help a user find the latch 312, such as by touch alone. In some implementations, the indicator 348 can provide clearance for one of the user's digits (e.g., a thumb) to access and actuate the latch 312. In some embodiments, the indicator 348 can help a user identify which end of the receiving portion 300 the user is grasping and/or can facilitate orienting the receiving portion 300 relative to the insert 200. As illustrated, in some embodiments, the indicator 348 is positioned in one or more corners of the receiving portion 300. For example, one or more corners that are near or adjacent to the base 344 of the latch 312 can be recessed. In certain variants, the indicator 348 is positioned elsewhere on the receiving portion 300, such as on a corner that is near or adjacent the tip 334, on the opposed face 301, and/or on a sidewall. As illustrated, the indicator 348 can have a concave shape, such as a scoop, scallop, or otherwise. In some embodiments, the indicator 348 has a convex shape, such as a bump, rib, or other protruding feature. As shown in FIG. 13C, certain implementations have an indicator 348 on each lateral side of the base 344 of the latch 312.

Assembling the Interconnect

Referring back to FIG. 1, a method of assembling the interconnect assembly 100 will now be described. In some configurations, the interconnect assembly 100 is assembled by moving the receiving portion 300 while the insert 200 is maintained substantially immobile. For example, in some embodiments, the insert 200 is rigidly mounted on a helmet (such as a helmet configured to mount a device assembly, e.g., an enhanced night vision goggle (ENVG) assembly), which is maintained in a position relative to a user, and the receiving portion 300 is moved relative to and/or into engagement with the insert 200. In some embodiments, the receiving portion 300 is connected with the device assembly, such as through the cable 302. In some variants, the insert 200 is configured to connect, to an external device, such as a computer, radio transceiver, and/or power source. Thus, in certain implementations, when engaged, the interconnect assembly 100 can provide data and/or power communication between the helmet (e.g., the ENVG assembly) and the external device. In certain variants, the insert 200 is connected with the device assembly (such as through one or more cables in the helmet) and the receiving portion 300 is connected with the external device through the cable 302.

In some embodiments, the receiving portion 300 is brought toward the insert 200. The guide groove 304 of the receiving portion 300 can be seated onto the guide protrusion 204 of the insert 200. The guide protrusion 204 and the guide groove 304 can allow for "blind" (e.g., tactile only and/or non-visual) alignment of the insert 200 with the receiving portion 300. Referring to FIGS. 2 and 3, once the guide protrusion 204 is seated in the guide groove 304, the hook protrusions 222 align with the slots 322. In some embodiments, the hook protrusions 222 can sit in ingress channels 324 that guide the hook protrusions 222 into slots 322. The receiving portion 300 is rotated toward the insert 200, causing the hook protrusions 222 to advance into the slots 322. The hook protrusions 222 can have a cam surface. The cam surface can facilitate a smooth rocking motion as the receiving portion 300 is rotated toward the insert 200. The smooth rocking motion can facilitate the hook protrusions 222 maintaining contact with the ingress channels 324 and/or maintaining alignment with the slots 322.

The receiving portion 300 can be rotated toward the insert 200 until the tip of the latch 312 hits the key 212 of the insert 200. The receiving portion 300 can be forced over the key 212 of the insert 200. For example, a cam surface on the tip 334 of the latch 312 can cause the key 212 to temporarily push the latch 312 into the latch-release position as the latch 312 is forced over the key 212. Once the key 212 clears the tip 334 of the latch 312, the resilient member 342 of the latch 312 forces the tip 334 of the latch 312 back into the latch-closed position, thereby securing the key 212 under the latch 312. In various embodiments, the receiving portion 300 is now secured to the insert 200 by the hook protrusions 222 residing within the slots 322 at one end of the receiving portion 300 and by the key 212 residing under the latch 312 at the opposing end of the receiving portion 300.

Referring to FIG. 11, the receiving portion 300 can be uncoupled from the insert 200 by pushing the base 344 of the latch 312, such as toward the base 346 of the resilient member 342. This can bring the latch 312 into the latch-release position. In some configurations, at least ten pounds of force must be applied (e.g., by a user) to the latch 312 to bring the latch 312 into the latch-release position. In some configurations, less than ten pounds of force must be applied to the latch 312 to bring the latch 312 into the latch-release position. The base 344 of the latch 312 can be found by feeling for the tactile features 338, allowing for "blind" release of the interconnect assembly 100. After the latch 312 is in the latch-release position, the receiving portion 300 can be rotated away from the insert 200, freeing the hook protrusions 222 from the slots 322 and disconnecting the receiving portion 300 from the insert 200.

Although the method of coupling and uncoupling the interconnect assembly 100 was describe with the insert 200 being substantially immobile, the process could be performed by moving the insert 200 while keeping the receiving portion 300 substantially immobile. Also, while the interconnect assembly 100 was shown as having the key 212 and hook protrusions 222 at the short-dimension ends of the insert 200, these features could be positioned on the long-dimension ends of the insert 200 with the receiving portion 300 being adapted accordingly. Placing the hook protrusions 222 and key 212 along the short-end dimensions of the insert 200 may be beneficial in that it provides a greater leverage for forcing the key 212 past the latch 312.

In some configurations, the insert 200 can be retained in the receiving region 300 by a latch 312 that is secured in the latch-closed position by a thumbscrew (not shown) rather than by the resilient member 342 that biases the latch 312 into the latch-closed position. In some configurations, the latch 312 is secured in the latch-closed position by a rotatable flange that can be swung out to restrict movement of the latch 312. In some embodiments, the latch 312 includes a combination of these aforementioned features to secure the latch 312 in the latch-closed position.

Certain Terminology

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Terms of orientation used herein, such as "top," "bottom," "proximal," "distal," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are to scale, but such scale should not be limiting, since dimensions and proportions other than what are shown are contemplated and are within the scope of the disclosed invention. Distances, angles, etc., are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

SUMMARY

In summary, various embodiments and examples of interconnect assemblies have been disclosed. Although the interconnect assemblies have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

The following is claimed:

1. An interconnect assembly comprising:
an insert comprising:
a docking array of connectors;
a key; and
a hook protrusion;
a receiving portion comprising:
an access array of connectors;
a latch; and
a slot;
wherein the docking array is configured to align with the access array when the hook protrusion is inserted into the slot, and wherein the hook protrusion further comprises a curved cam surface.

2. The interconnect assembly of claim 1, further comprising a guide protrusion disposed on the insert, the guide protrusion being sized to fit within a guide groove disposed on the receiving portion.

3. The interconnect assembly of claim 2, wherein the hook protrusion aligns with the slot when the guide protrusion is within the guide groove.

4. The interconnect assembly of claim 1, wherein the receiving portion further comprises an ingress channel aligned with the slot.

5. An interconnect assembly comprising:
an insert comprising:
a docking array of connectors;
a key; and
a hook protrusion;
a receiving portion comprising:
an access array of connectors;
a seal that surrounds the access array;
a latch; and
a slot;
wherein the docking array is configured to align with the access array when the hook protrusion is inserted into the slot.

6. The interconnect assembly of claim 1, wherein the receiving portion further comprises a ledge surrounding a recessed pocket, at least a portion of the latch being disposed within the pocket.

7. The interconnect assembly of claim 6, wherein the latch further comprises a base and a tip, the tip being configured to move away from the insert when the base rotates about an axis of the latch in a direction toward the ledge, the ledge being configured to limit a rotation of the base about the axis of the latch in the direction toward the ledge.

8. The interconnect assembly of claim 1, wherein the access array comprises electrical connectors.

9. The interconnect assembly of claim 1, wherein the access array comprises a spring-loaded connector.

10. An electrical connector comprising:

a docking array of connectors disposed on a docking surface;

a pin assembly disposed on an opposite surface, the opposite surface being substantially parallel with the docking surface;

a sidewall extending between the docking surface and the opposite surface;

a guide protrusion disposed on the sidewall, the guide protrusion having an edge that is substantially co-planar with the opposite surface; and a hook protrusion disposed on the sidewall, the hook protrusion having a surface that is substantially co-planar with the docking surface, wherein the surface of the hook protrusion curves toward the opposite surface as the surface extends away from the sidewall.

11. The interconnect assembly of claim 1, wherein the insert is a component of an enhanced night vision goggle.

12. The interconnect assembly of claim 1, wherein the receiving portion comprises a sidewall configured to surround the insert.

13. The interconnect assembly of claim 12, wherein the sidewall comprises a protrusion configured to align the docking array connectors with the access array connectors.

14. The electrical connector of claim 10, further comprising a key disposed on the sidewall.

15. The electrical connector of claim 14, wherein the key is disposed along a first edge of the docking surface, the hook protrusion is disposed along a second edge of the docking surface, the first edge being opposite of the second edge.

* * * * *